United States Patent [19]

Owada et al.

[11] Patent Number: 5,040,060
[45] Date of Patent: Aug. 13, 1991

[54] IMAGE INFORMATION TRANSMISSION SYSTEM WITH COMPRESSION BASED ON STILL-IMAGE REDUNDANCY

[75] Inventors: Mitsuru Owada, Yokohama; Yoshiki Ishii, Hadano; Shingo Ikeda, Kawasaki, all of Japan

[73] Assignee: Canon Kabushiki Kaisha, Tokyo, Japan

[21] Appl. No.: 657,987

[22] Filed: Feb. 21, 1991

Related U.S. Application Data

[63] Continuation of Ser. No. 602,921, Oct. 25, 1990, abandoned, which is a continuation of Ser. No. 275,504, Nov. 23, 1988, abandoned.

[30] Foreign Application Priority Data

Dec. 1, 1987 [JP] Japan ............................... 62-301553
Oct. 5, 1988 [JP] Japan ............................... 63-252763

[51] Int. Cl.$^5$ ............................................. H04N 7/13
[52] U.S. Cl. ....................................... 358/135; 358/136
[58] Field of Search ............... 358/133, 135, 136, 105, 358/138

[56] References Cited

U.S. PATENT DOCUMENTS

| | | | |
|---|---|---|---|
| 4,203,352 | 10/1987 | Kondo | 358/135 |
| 4,679,079 | 7/1987 | Catros et al. | 358/135 |
| 4,729,021 | 3/1988 | Kondo | 358/135 |
| 4,796,087 | 1/1989 | Guichard et al. | 358/136 |
| 4,802,005 | 1/1989 | Kondo | 358/105 |
| 4,845,560 | 7/1989 | Kondo et al. | 358/135 |
| 4,903,124 | 2/1990 | Hoshi et al. | 358/133 |

Primary Examiner—Victor R. Kostak
Attorney, Agent, or Firm—Fitzpatrick, Cella, Harper & Scinto

[57] ABSTRACT

An image information transmission system for transmitting multi-pixel frames of image information, upon transmission, the data corresponding to a frame are divided into blocks each containing a predetermined number of pixel data, and discrimination data are prepared by discriminating whether each block belongs to a moving image area or a still image area of the frame. The data of a block of a moving image area are encoded using only the data of that block and according to a first encoding method, to form first encoded data. The data of a block of a still image area are encoded using the data of that block and those of other blocks, and according to a second encoding method, to form second encoded data. Transmission data are prepared from the encoded data and the discrimination data, and are sent to the transmission channel. At the receiving side, the encoded data and discrimination data are separated from the transmission data, and the encoded data are decoded either by a first or a second decoding method corresponding respectively to the first or a second decoding method, according to the separated discrimination data, to restore the original pixel data. This process reduces the amount of information to be transmitted while suppressing deterioration of the image information.

20 Claims, 7 Drawing Sheets

IMAGE INFORMATION TRANSMISSION SYSTEM WITH COMPRESSION BASED ON STILL-IMAGE REDUNDANCY

This application is a continuation of application Ser. No. 07/602,921, filed Oct. 25, 1990, which was a continuation of application Ser. No. 07/275,504, filed Nov. 23, 1988.

BACKGROUND OF THE INVENTION

1. Field of the Invention

The present invention relates to an image information transmission system capable of encoding and transmitting image information with a high efficiency.

2. Related Background Art

Among such image information transmitting methods, there is already known, for example, a high efficiency encoding method for the television signal. In order to limit the transmission band width, said method employs the so-called min-max method which reduces the average number of bits per pixel. This min-max method will be described in the following.

The television signal has a strong time-space correlation. When an image is divided into small blocks, each block usually has a relatively small dynamic range due to the local correlation. Consequently, highly efficient information compression is possible by determining the dynamic range in each block and effecting adaptive encoding.

In the following this encoding method will be explained further, with reference to the attached drawings.

Figure 1:
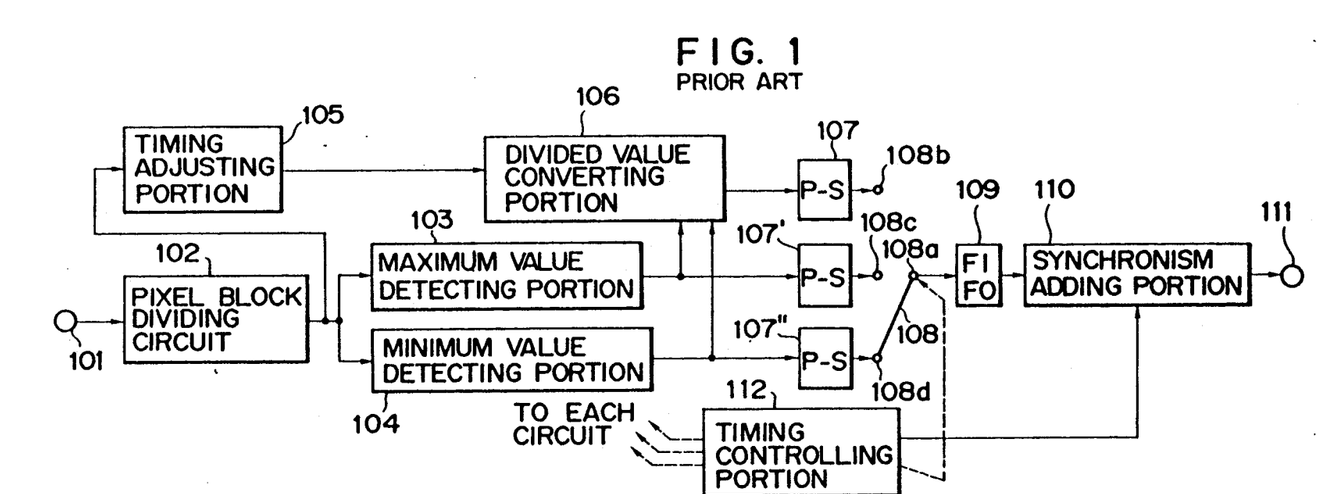
FIG. 1 is a schematic block diagram of the transmitting part of an image information transmission system of a prior art system.

FIG. 1 schematically shows an image information transmitting system, as an example of prior technology. An input terminal 101 receives digital image data obtained by sampling a raster-scan analog image signal such as a television signal with a predetermined sampling frequency to obtain data of n bits per sample. Said digital image data of $2^n$ levels are supplied to a pixel block dividing circuit 102.

Figure 2:
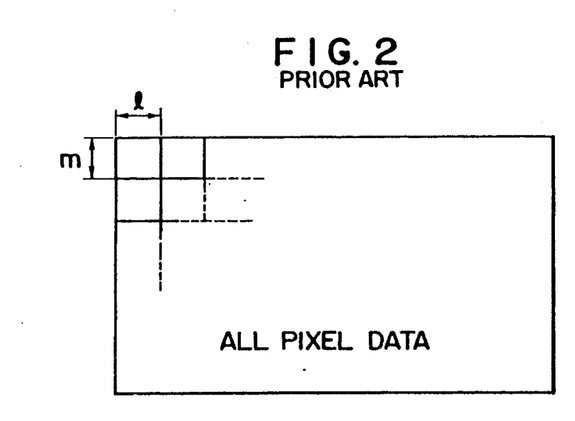
FIG. 2 is a view showing the mode of division of image data into pixel blocks.

FIG. 2 shows the mode of division of pixel data of a frame into pixel blocks. The pixel block dividing circuit 102 stores all the pixel data of a frame into a memory, and reads said pixel data in units of pixel blocks composed of l pixels in the horizontal (H) direction and m pixels in the vertical (V) direction. Thus the data are released units of pixel blocks.

Figure 3:
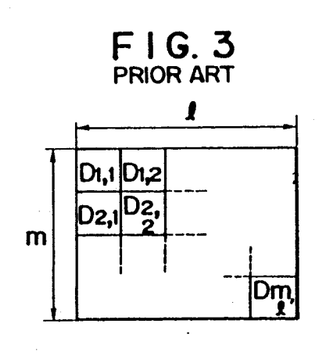
FIG. 3 is a view showing the arrangement of data in each pixel block.

FIG. 3 shows the structure of each pixel block, wherein $D_{1,1} - D_{m,1}$ represent respective pixel data. The image data released from the pixel block dividing circuit 102 are supplied to a maximum detecting circuit 103, a minimum detecting circuit 104 and a timing regulating or adjusting circuit 105, whereby the maximum datum (Dmax) and the minimum datum (Dmin) are detected by the detecting circuits 103, 104, from among all the pixel data $(D_{1,1} - D_{1,m})$ in each pixel block.

The timing adjusting circuit 105 delays all the pixel data by a time required by the maximum defecting circuit 103 and the minimum detecting circuit 104 for detecting Dmax and Dmin, and sends, to a divided value converting circuit 106, the pixel data of each pixel block in a predetermined order, for example $D_{1,1}, D_{2,1}, D_{3,1}..., D_{m,1}, D_{1,2}, ..., D_{m,2}, ..., D_{1,(l-1)}, ..., D_{m,(l-1)}, D_{1,l}, ..., D_{m,l}$.

In this manner, all the pixel data $(D_{1,1} - D_{m,l})$ in each pixel block and the maximum value (Dmax) and the minimum value (Dmin) are supplied to the divided value converting circuit 106, and there is obtained a division code of k bits $(\Delta_{1,1} - \Delta_{m,1})$ determined by comparison of each pixel datum with $2^k$ digitizing levels defined between Dmax and Dmin, wherein k is an integer smaller than n. The mode of this digitization is shown in FIG. 4A.

Figures 4A, 4B:
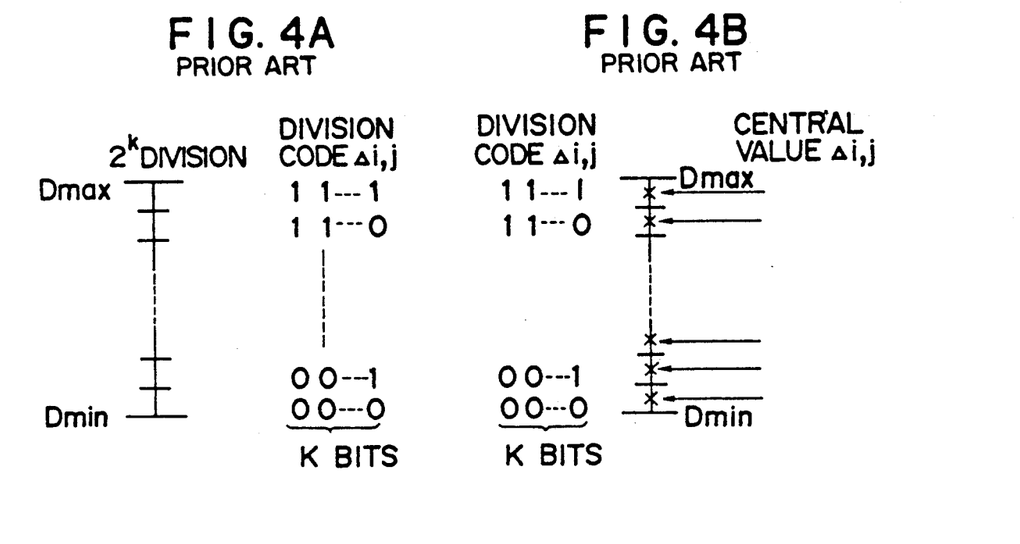
FIG. 4A is a chart showing the conversion characteristic of a divided value converting circuit shown in FIG. 1.
FIG. 4B is a chart showing the conversion characteristic of a divided value inverse converting circuit shown in FIG. 6.
Figure 5:
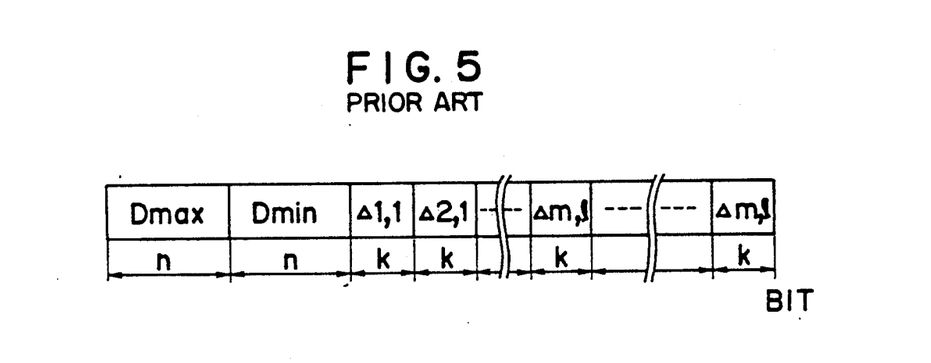
FIG. 5 is a chart showing the format of transmission data.

As shown in FIG. 4A, the code $\Delta_{i,j}$ is released as a binary code of k bits. The division codes $\Delta_{i,j}$ of k bits and, Dmax and Dmin of n bits thus obtained are respectively supplied to parallel-to-serial converters 107, 107', 107'' for conversion into serial data, and further converted in a data selector 108 into serial data as shown in FIG. 5, illustrating the transmission data for a pixel block.

The data from the data selector 108 are subjected to a time-axis treatment for obtaining a fixed data transmission rate in a first-in-first-out (FIFO) memory 109, then subjected to the addition of a synchronization signal in a synchronization adding circuit 110, and sent, from an output terminal 111, to a transmission channel, for example a magnetic recording reproducing system of a video cassette recorder. The synchronization signal may be added to every pixel block or every predetermined number of pixel blocks. The function timing of the above-described circuits is determined according to timing signals released from a timing control circuit 112.

Figure 6:
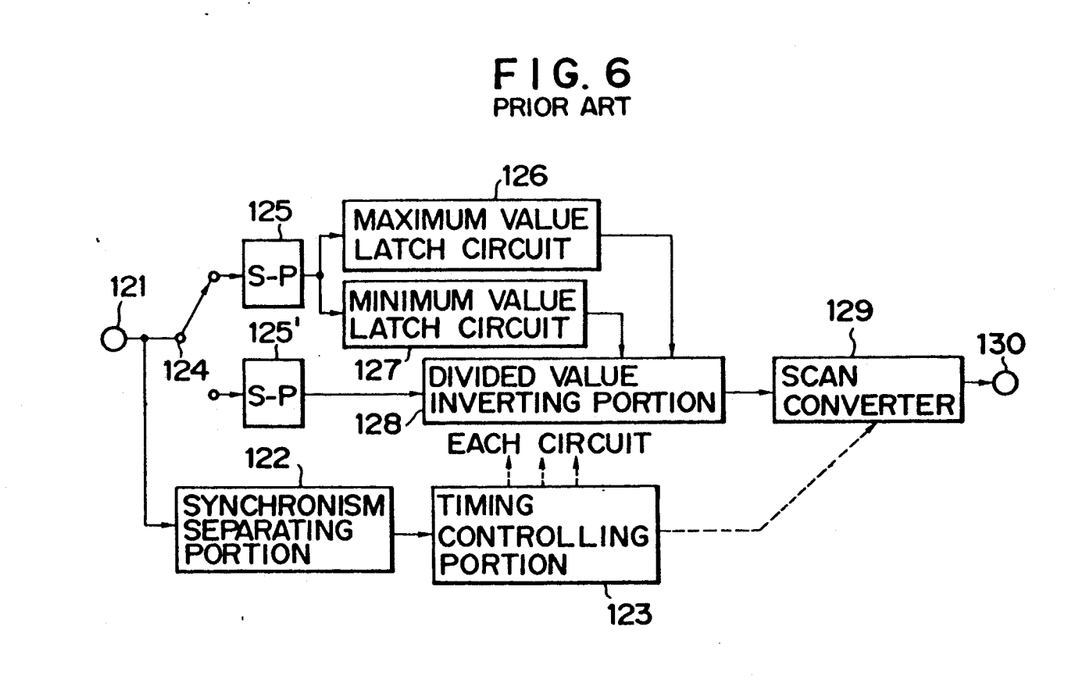
FIG. 6 is a schematic block diagram of a receiving constituting a counterpart of the transmitting part of the image information transmission system shown in FIG. 1.

FIG. 6 schematically shows the receiving circuit, constituting a counterpart of the data transmission circuit shown in FIG. 1. An input terminal 121 receives the transmission data subjected to high efficiency transmission in the transmitting circuit described above. The synchronization signal in the entered transmission data is separated by a synchronization separating circuit 122 and is supplied to a timing control circuit 123, which determines the function timing of various portions of the receiving circuit according to said synchronization signal.

On the other hand, a data selector 124 separates the transmission data into data Dmax, Dmin of n bits and codes $\Delta_{i,j}$ obtained by digitizing each pixel data into k bits between Dmax and Dmin. These separated data are respectively converted into parallel data by serial-to-parallel converters 125, 125'. The maximum datum Dmax and the minimum datum Dmin in each pixel block, converted into parallel data by the converter 125, are respectively latched by latch circuits 126, 127, and said latch data Dmax, Dmin are supplied to a divided value inverse converting circuit 128. On the other hand, the division codes $\Delta_{i,j}$ representing the pixel data in each pixel block are released in the aforementioned order from the serial-to-parallel converter 125' and supplied to the divided value inverse converting circuit 128.

FIG. 4B illustrates the mode of restoring representative data $D'_{i,j}$ relating to the original pixel data, from the division code $\Delta_{i,j}$ and the values Dmax, Dmin. The representative values are set, for example, at the middle of the digitizing levels which divide the area between Dmax and Dmin into $2^k$ zones. The representative values of n bits $(D'_{1,1} - D'_{m,1})$ obtained from the divided value inverse converting circuit 128 are released in the aforementioned order for each pixel block. A scan converter 129 converts the output data of the divided value inverse converting circuit 128 into an order corresponding to raster scanning, and sends the thus obtained decoded image data to an output terminal 130.

It is to be noted, however, that the prior technology described above only utilizes the correlation of image in the two-dimensional space. Consequently the transmitted information contains redundancy in the time axis if a still image or images with limited movement are transmitted. In such case the efficiency of transmission deteriorated as the same information is transmitted repeatedly.

SUMMARY OF THE INVENTION

An object of the present invention is to provide an image information transmitting system capable of resolving the above-described drawbacks.

Another object of the present invention is to provide an image information transmitting system capable of reducing the amount of transmitted information while suppressing deterioration of the image information, thereby enabling transmission of image information with a high transmission efficiency.

According to an embodiment of the present invention, the foregoing objects can be achieved by an image information transmitting system for transmitting image information in which a frame is composed of plural pixel data, comprising:

dividing means for dividing plural pixel data, corresponding to the image information of said frame, into plural pixel blocks each containing a predetermined number of pixel data;

discrimination means for discriminating whether each pixel block, divided by said dividing means, belongs to a moving image area in said frame or to a still image area;

first encoded data forming means for encoding the pixel data in the pixel block divided by said dividing means, utilizing solely the pixel data in said pixel block and according to a first encoding method, thereby forming first encoded data;

second encoded data forming means for encoding the pixel data in the pixel block divided by said dividing means, utilizing the pixel data in said pixel block and those in another pixel block, according to a second encoding method, thereby forming second encoded data; and transmission data forming means for causing the pixel data of a pixel block, discriminated as belonging to a moving image area by said discrimination means, to be encoded by said first encoded data forming means and causing the pixel data of a pixel block, discriminated as belonging to a still image area to be encoded by said second encoded data forming means, and forming transmission data from thus encoded data.

Still another object of the present invention is to provide an image information transmission system capable of efficient transmission of image information while suppressing deterioration of the information resulting from errors in the transmission signals on the transmission channel.

According to an embodiment of the present invention, the above-mentioned object can be achieved by an image information transmission system for transmitting image information in which a frame is composed of plural pixel data, comprising:

dividing means for dividing plural pixel data, corresponding to the image information of said frame, into plural pixel blocks each containing a predetermined number of pixel data;

discrimination means for discriminating whether each pixel block, divided by said dividing means, belongs to a moving image area in said frame or to a still image area and releasing the result of said discrimination;

conversion means for inspecting the result of discrimination obtained from said discrimination means for a predetermined period in each of the pixel blocks divided by said dividing means, and, if the result of discrimination for each pixel block indicates the still image area continuously over said predetermined period, converting the latest result of discrimination into the other;

first encoded data forming means for receiving the pixel data in a pixel block divided by said dividing means, and encoding said pixel data utilizing solely the pixel data in said pixel block according to a first encoding method, thereby forming first encoded data;

second encoded data forming means for receiving the pixel data in a pixel block divided by said dividing means, and encoding said pixel data utilizing the pixel data of said pixel block and those of another block according to a second encoding method, thereby forming second encoded data; and selective output means for selectively releasing the first encoded data from said first encoded data forming means or the second encoded data from said second encoded data forming means, according to the result of discrimination from said conversion means.

The foregoing and still other objects of the present invention, and the advantages thereof, will become fully apparent from the following detailed description of the preferred embodiments, which is to be taken in conjunction with the attached drawings.

DETAILED DESCRIPTION OF THE PREFERRED EMBODIMENTS

Now the present invention will be clarified in greater detail by description of the preferred embodiments thereof.

Figure 7:
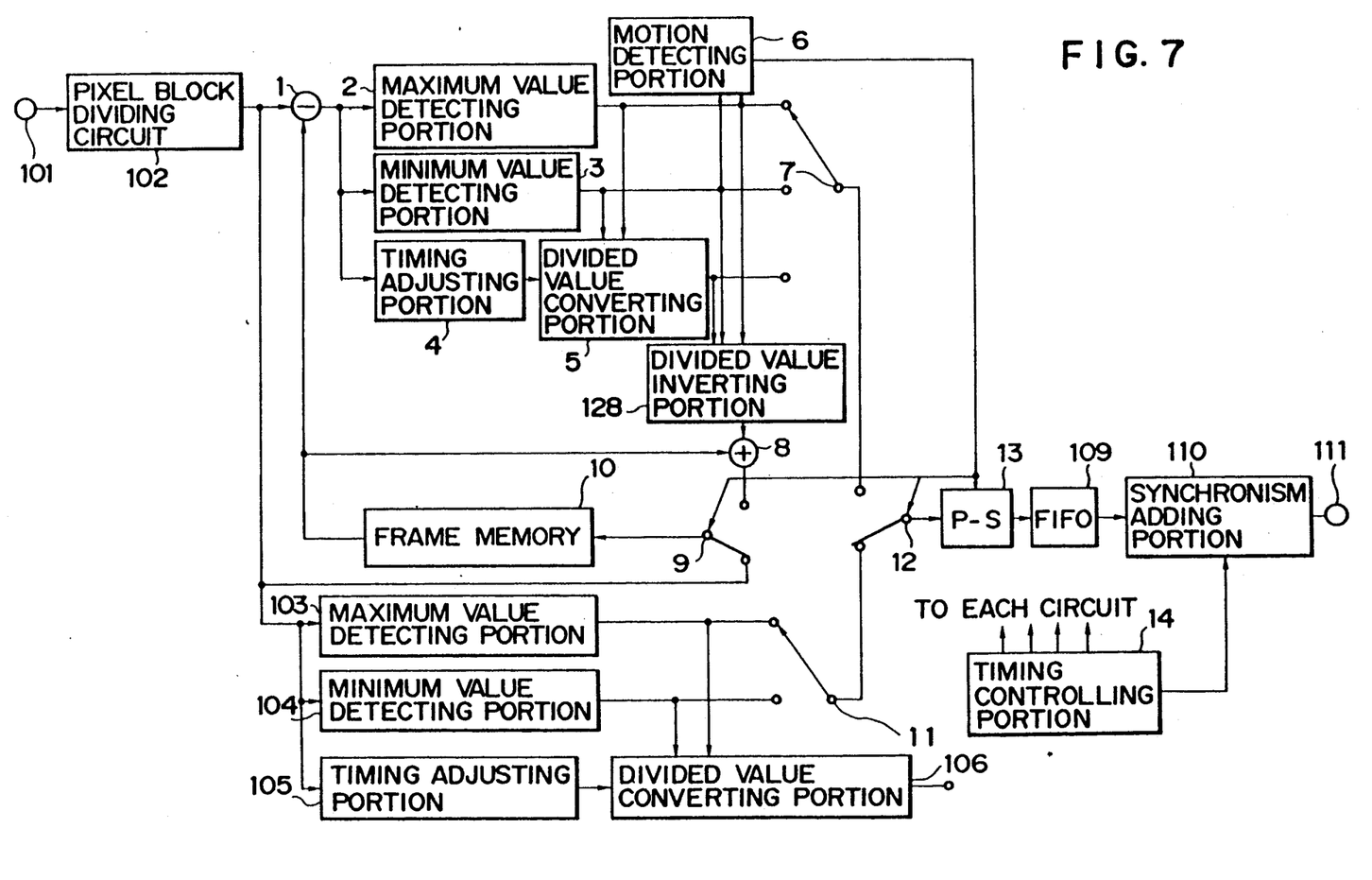
FIG. 7 is a block diagram of the transmitting part of the image information transmission system constituting a first embodiment of the present invention.
Figure 8:
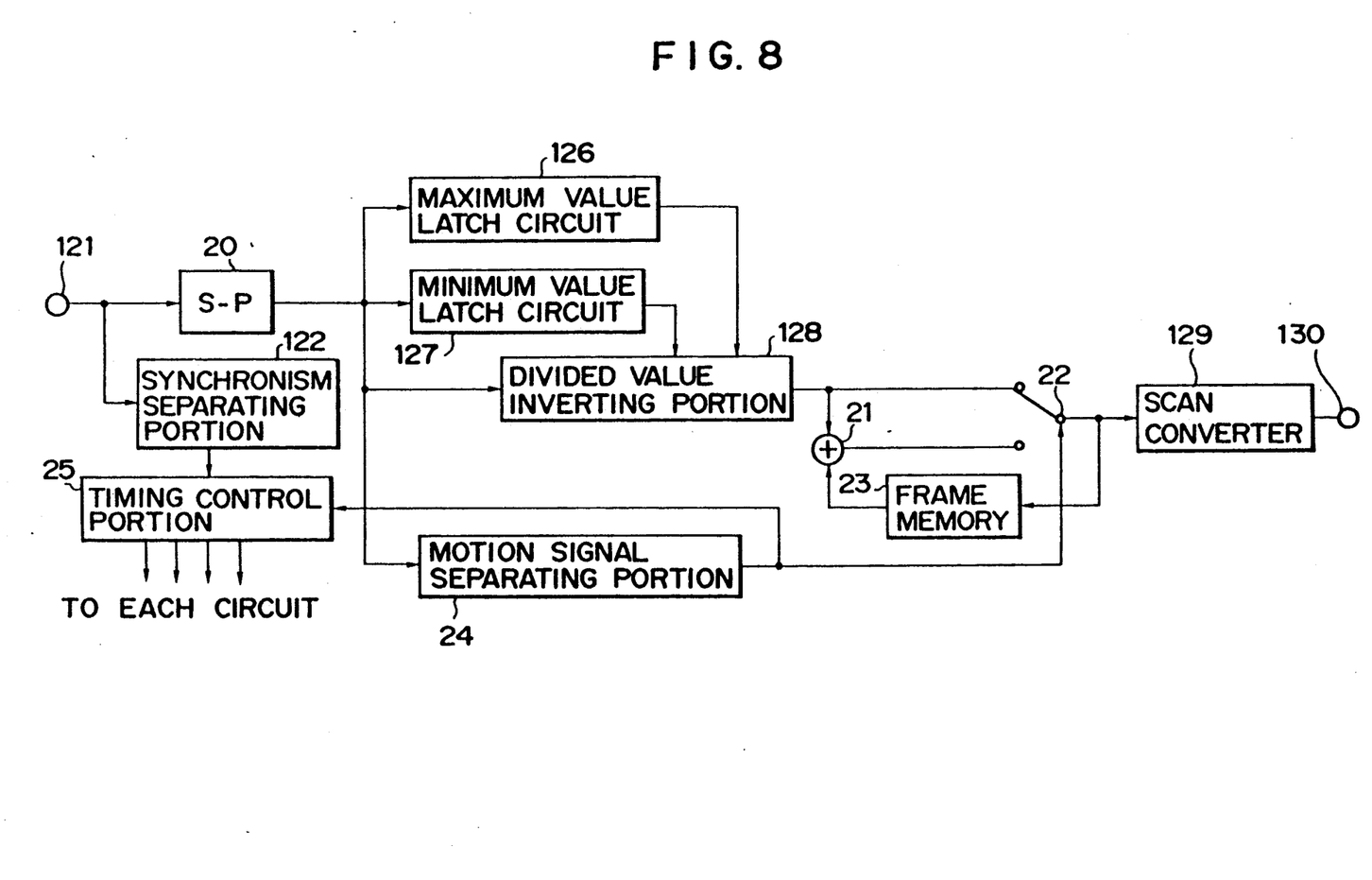
FIG. 8 is a block diagram of the receiving part of the image information transmission system constituting the first embodiment of the present invention.

FIGS. 7 and 8 schematically illustrate the structure of an image information transmitting system constituting a first embodiment of the present invention, wherein FIGS. 7 and 8 respectively illustrate the transmitting part and the receiving part. Also in FIGS. 7 and 8, the same components as those in FIGS. 1 and 6 are represented by the same numbers and will not be explained further.

In the following description, there will only be explained the portions which are different from the prior art.

In FIG. 7:

1 is a subtractor for subtracting the output of a frame memory 10 from the output of a pixel block dividing circuit 102;

2 is a maximum detector for determining the maximum of the output from the subtractor 1;

3 is a minimum detector 3 for likewise determining the minimum;

4 is a timing adjusting circuit for adjusting the transmission time from the maximum detector 2 to a divided value converting circuit 5;

6 is a motion detecting circuit for detecting motion from the outputs of the maximum detector 2 and of the minimum detector 3;

7 is a selector for selecting the outputs of said detectors;

8 is an adder for adding the outputs of a divided value inverse converter 128 and frame memory 10;

9 is a selector for selecting the output of the adder 8 or the output of the pixel block dividing circuit 102, as the input to the frame memory;

10 is the above-mentioned frame memory for storing the signal from the selector 9;

11 is a selector for selecting the output of the maximum detector 103, that of the minimum detector 104 or that of the divided value converter 106;

12 is a selector for selecting the signal from the selector 7 or that from the selector 11 for supply to a parallel-to-serial converter 13;

13 is the above-mentioned parallel-to-serial converter for effecting a parallel-to-serial conversion on the signal from the selector 12 and adding the output of the motion detector 6; and 14 is a timing controller for controlling the timing of various circuits.

Also in FIG. 8:

20 is a serial-to-parallel converter for serial-to-parallel conversion of the signal from an input terminal 121;

21 is an adder for adding the output of a divided value inverse converter 128 and that of a frame memory 23;

22 is a selector for selecting the output of the divided value inverse converter 128 or that of the adder 21 for supply to a scan converter 129;

23 is a frame memory for storing the signal from the selector 22;

24 is a motion signal separator for separating the motion signal from the output of the serial-to-parallel converter 20; and 25 is a timing controller for controlling the timing of various circuits according to the output of a synchronization separator 122.

In the following there will be explained the function of the transmitting system shown in FIG. 7.

The digital image data entered from the input terminal 101 shown in FIG. 7 are rearranged in units of blocks by the pixel block dividing circuit 102, and are supplied to a signal processing unit utilizing the frame-to-frame difference DCPM and the min-max method, and to another signal processing unit utilizing only the min-max method. In the former signal processing unit, equipped with the frame memory 10, the difference 1 between the present frame and the preceding frame is determined by the subtractor 1, and the obtained difference is encoded again with a min-max encoder consisting of maximum detector 2, minimum detector 3, timing adjusting circuit 4, divided value converter 5 and selector 7. The thus re-encoded signal is decoded by the divided value inverse converter 128, and is added to the output of the frame memory 10 by the adder 8. Then new pixel data are written into the frame memory 10 through the selector 9.

These decoding and rewriting operations allow renewal of the content of the frame memory, and to match said content with that of the frame memory of the receiving side. These operations realize the encoding by the frame-to-frame difference DPCM and the min-max method.

The detection of motion is achieved by determining the difference between the maximum detector 2 and the minimum detector 3 in the motion detector 6 and comparing the obtained value with a threshold value. In increase in said threshold value improves the efficiency of transmission, but results in deterioration of the image quality in the moving image and jerkiness in the reproduced image. On the other hand, a decrease in said threshold value reduces the deterioration in image quality, but deteriorates the efficiency of transmission. Consequently the threshold value should be suitably selected in consideration of these facts.

The signal process by the min-max method only is achieved by a min-max encoder consisting of the maximum detector 103, minimum detector 104, timing adjusting circuit 105, divided value converter 106, and selector 11.

The outputs of these signal processings are selected in the unit of block according to the output of the motion detecting circuit 6. The signal process with the frame-to-frame difference DPCM and the min-max method is adopted if the image is close to a still image, and the signal processing utilizing the minmax method only is selected if a moving image is involved, through the selector 12. Simultaneous with the switching, the input signal to the frame memory 10 is shifted by the selector 9, in the case of a moving image, from the DCPM/min-max decoded signal to the signal of the pixel block dividing circuit 120, thereby refreshing the content of the frame memory 10 (involving errors accumulated by DPCM) to a correct value.

The parallel-to-serial converter 13 converts the input parallel data into serial data, and adds motion data of 1 bit from the motion detector 6. The subsequent processing is the same as in the conventional technology shown in FIGS. 1-6.

In the following there will be explained the function of the receiving part shown in FIG. 8.

The input terminal 121 shown in FIG. 8 receives the transmission data which have been high-efficiency encoded in the transmitting part described above. The synchronization signal contained in the input data is separated by the synchronization separator 122 and is supplied to the timing controller 25, which determines the function timing of various circuits in response to said synchronization signal.

On the other hand the serial-to-parallel converter 20 converts the input serial data into parallel data, and the information of motion is separated by the motion signal separator 24. The pixel data of each block in parallel form are decoded by the maximum latch circuit 126, minimum latch circuit 127 and divided value inverting converter 128.

In the case of a moving image, according to the output of the motion signal separator 24, the selector 22 directly enters the decoded signal to the scan converter 129. In the case of a still image, the decoded signal is entered after the addition of the output of the frame memory 23 in the adder 21. The frame memory 23 receives the same signal as the scan converter 129 receives. Said frame memory 23 decodes the difference values of the frame, transmitted in the case of a still image, into the original pixel data. The subsequent operation is the same as in the prior art (FIGS. 1–6).

In the following there will be explained the decrease in the number of transmitted bits by the combined use of the frame-to-frame DCPM method and the min-max method.

If the frame-to-frame difference of the pixel data is formed, utilizing the redundancy of image in time, the obtained data show reduced dynamic range. This tendency becomes more marked if the redundancy is larger, namely if the image is close to a still image. In the motion detecting circuit of the present embodiment, the discrimination of a still image relies on a trade-off between the correlation in time axis and the correlation in two-dimensional space. More specifically, if the correlation in the time axis is very strong, the correlation in two-dimensional space need not be too high. On the other hand, if the former is not too strong, the latter needs to be very strong. It will be understood that, under such condition, the number of effective bits can be significantly reduced. The necessary number of bits for the maximum and minimum values can be determined from the above-mentioned condition, and the necessary number of bits for the divided value converter can be determined from the threshold value of the motion detecting circuit.

As will be apparent from the foregoing explanation, the data compression rate is significantly improved by the combined use of the frame-to-frame DPCM method and the min-max method. As an example, in case of $n=8$, $l=m=3$ for the original data in each pixel block; and $n=3$, $k=2$ for a still image, the original data in each pixel block have $(8\times3\times3)=72$ bits while the transmission data have $(3\times2+2\times3\times3)=24$ bits, thus achieving a data compression rate of $\frac{1}{3}$.

Thus, the above-described image information transmitting system increases the compression rate for an image with a limited amount of information such as a still image, but adopts the normal compression rate in the case of a moving image, thereby avoiding the transmission of redundant information and improving the efficiency of transmission.

Though the foregoing description has been limited to the case of transmission of raster-scan image data, the present invention is applicable to the transmission of any image information regardless of the form of the original signal, and such application is possible through suitable changes in the structure of the pixel block dividing circuit 102 and the scan converter 129.

In the following there will be explained a second embodiment of the present invention.

Figure 9:
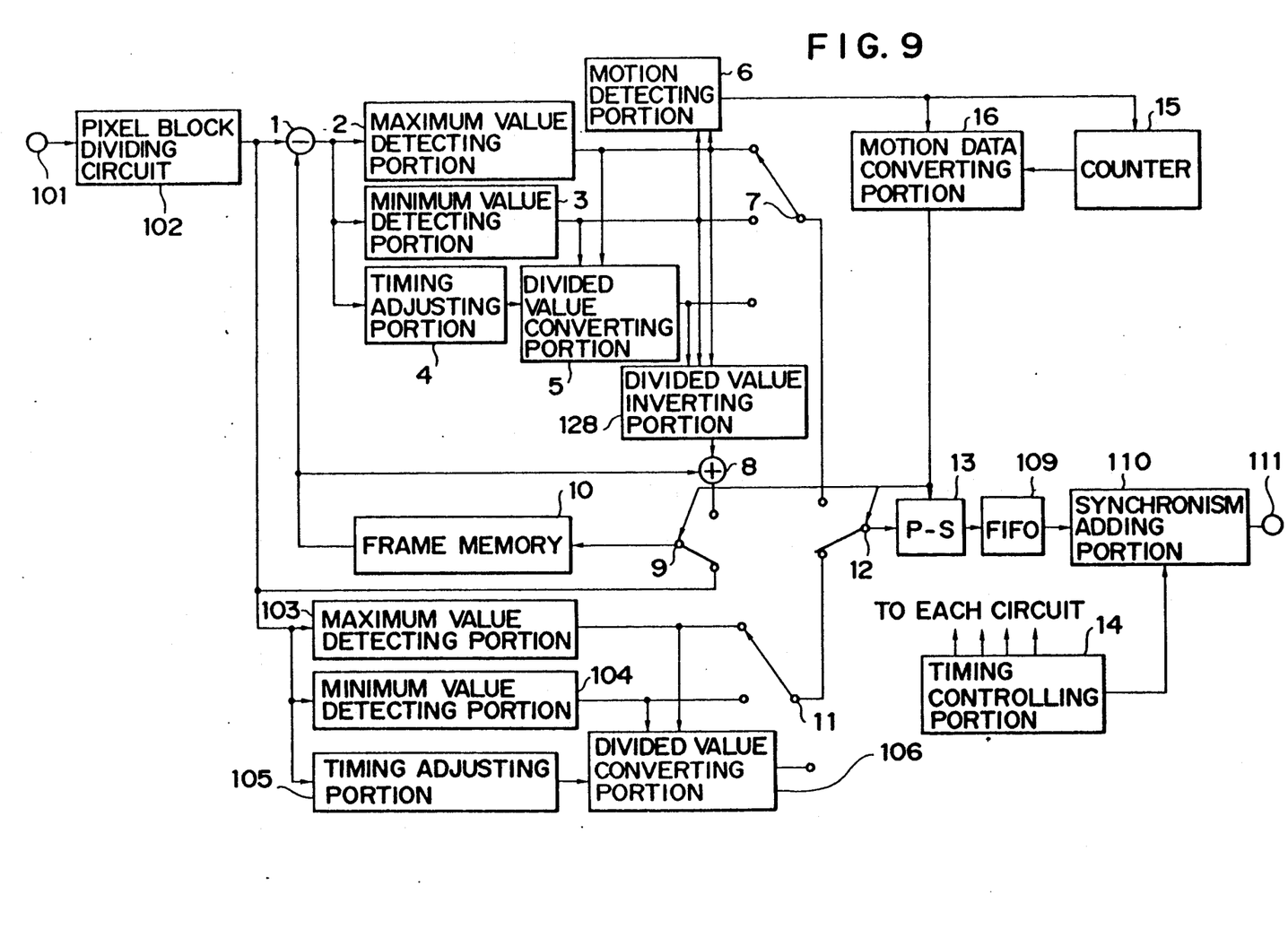
FIG. 9 is a block diagram of the transmitting part of the image information transmission system constituting a second embodiment of the present invention.

FIG. 9 is a block diagram of the transmitting part of an image information transmitting system constituting a second embodiment of the present invention. In FIG. 9, the same components as those in FIG. 7 are represented by the same numbers and will not be explained further.

The following description will be concentrated in portions that are different from those in the embodiment shown in FIG. 7.

In FIG. 9 there are shown a counter circuit 15 for counting, in each pixel block, predetermined motion data detected by said motion detecting circuit 6 in each pixel block; a motion data converter 16 for converting the motion data released from said motion detecting circuit 6, according to the count of said counter 15; and a parallel-to-serial converter 13 for effecting a parallel-to-serial conversion of the signal from the selector 12 and adding the output of the motion data converter 16.

In the following there will be given an explanation on the function of the transmitting system shown in FIG. 9.

The motion data, generated from the motion detecting circuit 6 in a similar manner as in the embodiment shown in FIG. 7, are supplied to the counter circuit 15 and the motion data converter 16.

Figure 10:
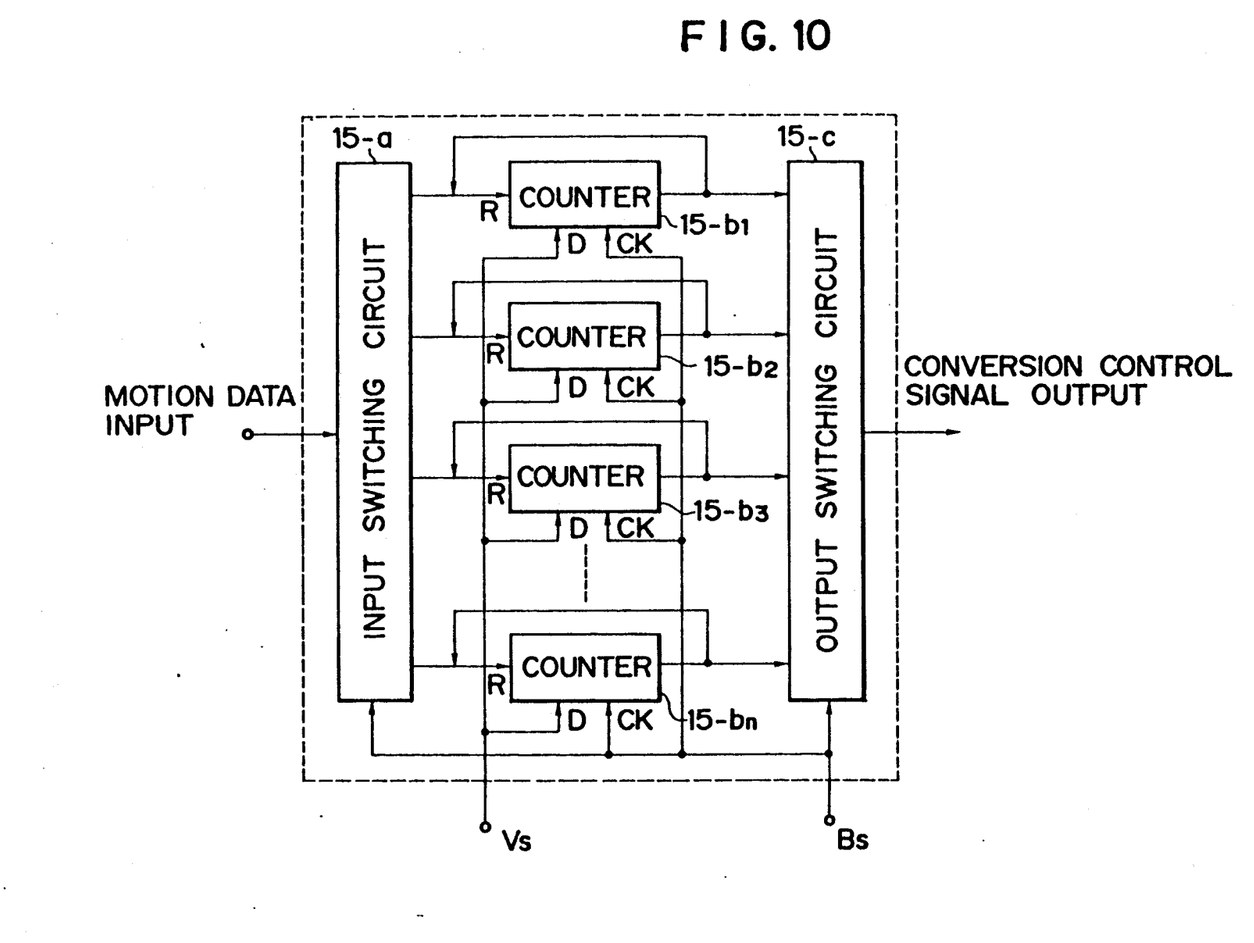
FIG. 10 is a block diagram of a counter circuit shown in FIG. 9.

The counter circuit 15 is composed, as shown in FIG. 10, of counters $15\text{-}b_1$ to $15\text{-}b_n$ of a number equal to the number of pixel blocks in a frame, divided by the pixel block dividing circuit 102, an input switching circuit 15-a for supplying the input motion data to corresponding counters, and an output switching circuit 15-c for selecting the signals from said counters in succession.

In the following the function of the counter circuit 15 will be explained, with reference to FIG. 10.

The motion data supplied from the motion detecting circuit 6 to the counter circuit 15 are entered into the input switching circuit 15-a, which supplies said motion data to reset terminals R of the counters in succession, in synchronization with pixel block synchronization signal BS supplied from the timing controller 14 to the counter circuit 15.

In each of the counters $15\text{-}b_1 - 15\text{-}b_n$, the pixel block synchronization signal BS and vertical synchronization signal VS are respectively supplied to a clock input terminal CK and a data input terminal D. Each counter counts upwards at every vertical synchronization signal VS, and sends a conversion control signal "0" to the output switching circuit 15-c in synchronization signal BS entered from the clock input terminal CK before the counter reaches a value K, or sends a conversion control signal "1" to the output switching circuit 15-c and to the resetting terminal R, thereby resetting said counter, when said counter reaches K.

The conversion control signals supplied from each counter to the output switching circuit 15-c are supplied to the data converter 16 in succession in synchronization with the pixel block synchronization signal released from the timing controller 14.

In this manner the counter circuit 15 inspects the motion data respectively corresponding to the pixel blocks, and releases a conversion control signal "1" in a case where motion data "0" indicating a still image continues for K frames, or a conversion control signal "0" otherwise, for supply to the motion data converter 16.

The motion data converter 16 releases the motion data entered from the motion detecting circuit 6 without change when the conversion control signal supplied from said counter circuit 15 is "0" or releases said motion data after conversion to "1" indicating the presence of motion when said conversion control signal is "1".

Because of the above-described function, the motion data released from the motion data converter 16 do not continue to stay at "0", indicating a still image state, for over K frames.

On the other hand, the signal processing by the min-max method only is achieved by a min-max encoder consisting of the maximum detector 103, minimum detector 104, timing adjusting circuit 105, divided value converter 106 and selector 11.

These two outputs of signal processing are selected in units of blocks according to the motion data released from the motion data converter 16. More specifically, the selector 12 selects the signal processing with the frame-to-frame difference DPCM method and the min-max method for motion data "0", or the signal processing with the min-max method only for the motion data "1". Simultaneous with this switching, the selector 9 shifts the input to the frame memory 10, in a case where the motion data is "1", from the signal processed with the frame-to-frame difference DPCM method and the min-max method to the signal supplied from the pixel block dividing circuit 102, thereby refreshing the content of the frame memory 10 and reducing the encoding error resulting from the DPCM method.

The parallel-to-serial converter 13 converts the parallel pixel block data into serial pixel block data, and attaches the motion data of 1 bit released from the motion data converter 16, to each pixel block data. The subsequent process is same as in the prior art.

The receiving system corresponding to the transmitting part of the image information transmitting system shown in FIG. 9 is same as the receiving part shown in FIG. 8, and will not, therefore, be explained.

The image information transmitting system described above is capable of increasing the data compression rate for a still image but selecting an ordinary compression rate for a moving image, thereby enabling flexible transmission of the image information, dispensing with transmission of redundant information and improving the efficiency of transmission.

Also in the present embodiment, the counter circuit 15 and the motion data converting circuit 16 function in such a manner that the motion data corresponding to any pixel block do not assume "0", indicating a still image, continuously over a predetermined number of frames, so that, even when the data transmitted on the transmission channel become erroneous, propagation of such error can be suppressed. More specifically, a pixel block discriminated as a still image in the transmitting part is encoded by the frame-to-frame DPCM and min-max method and transmitted, and the receiving part decodes the newly transmitted data with the data already transmitted and decoded. Therefore, if the data once become erroneous on the transmission channel, the data thereafter decoded are all erroneous. Thus the propagation of errors resulting from the error in the data on the transmission channel can be minimized by prohibiting, as explained above, the continuation of data conversion by the frame-to-frame DPCM and min-max method in excess of a predetermined number of frames in any pixel block.

The period of such data conversion by the DPCM and min-max method for any pixel block should be determined in consideration of the efficiency of data transmission.

More specifically, if said period is selected too short, the number of pixel blocks in which the data are compressed by data conversion with the interframe DPCM and min-max method is decreased, thereby resulting in an increased in the amount of transmitted data. On the other hand, if said period is selected too long, the propagation of errors in the data will increase.

Though the foregoing embodiment has been limited to the transmission of raster-scan image data, the present invention is applicable to any image information regardless of the form of the signal.

The transmission of information of other signal formats is possible by a suitable change in the structure of the pixel block dividing circuit 102 and the scan converter 129.

What is claimed is:

1. An image information transmitting apparatus for transmitting image information in which a frame is composed of plural pixel data, comprising:
   a) dividing means for dividing plural pixel data corresponding to image information of said frame into plural pixel blocks each containing a predetermined number of pixel data;
   b) discrimination means for discriminating whether each of said pixel blocks, divided by said dividing means, belongs to a moving image area or a still image area in said frame;
   c) first encoded data forming means for forming first encoded data by encoding the pixel data in a pixel block, divided by said dividing means, solely utilizing the pixel data of said pixel block according to a first encoding method;
   d) second encoded data forming means for forming second encoded data by encoding the pixel data in a pixel block, divided by said dividing means, utilizing the pixel data of said pixel block and those of another block according to a second encoding method; and
   e) transmission data forming means for causing the pixel data of a pixel block, discriminated by said discrimination means as belonging to a moving image area, to be encoded by said first encoded data forming means, also causing the pixel data of a pixel block, discriminated as belonging to a still image area, to be encoded by said second encoded data forming means, and forming transmission data from thus encoded data.

2. An apparatus according to claim 1, wherein said first encoded data forming means includes:
   a) distribution data forming means for receiving the pixel data of a pixel block, divided by said dividing means, and forming plural distribution data indicating the distribution of levels represented by the pixel data and being mutually distinguishable; and
   b) position data forming means for forming plural position data, indicating the position of the pixel data of the pixel block divided by said dividing means in the distribution of levels of pixel data represented by said plural distribution data, utilizing the plural distribution data formed by said distribution data forming means.

3. An apparatus according to claim 2, wherein said distribution data forming means includes:

a) maximum data detecting means for detecting and releasing the maximum data among the pixel data in each pixel block divided by said dividing means; and b) minimum data detecting means for detecting and releasing the minimum data among the pixel data in each pixel block divided by said dividing means.

4. An apparatus according to claim 3, wherein said position data forming means includes level range instructing data forming means for receiving the maximum data released from said maximum data detecting means and the minimum data released from said minimum data detecting means, dividing said dynamic range into plural level ranges by digitizing the dynamic range of the levels of the pixel data, determined by thus received maximum and minimum data, setting plural level range instructing data corresponding to the positions of the level ranges in said dynamic range, and forming and outputting said plural level range instructing data as said plural position data, representing the level ranges to which the levels of the pixel data in the pixel block divided by said dividing means belong.

5. An apparatus according to claim 1, wherein said second encoded data forming means includes:

a) difference data calculating means for calculating the difference data between the pixel data in a pixel block divided by said dividing means, and anticipated pixel data of a pixel block corresponding to the above-mentioned pixel block among the pixel blocks of an already transmitted frame;

b) distribution data forming means for receiving the difference data calculated by said difference data calculating means, and forming plural distribution data which represent the distribution of levels of the difference data and which are mutually distinguishable; and c) position data forming means for forming, by means of plural distribution data formed by said distribution data forming means, plural position data indicating the positions of the difference data calculated by said difference data calculating means in the distribution of levels of the difference data represented by said plural distribution data.

6. An apparatus according to claim 5, wherein said distribution data forming means includes:

a) maximum difference data detecting means for detecting and releasing the maximum difference data among the difference data calculated by said difference data calculating means; and b) minimum difference data detecting means for detecting and releasing the minimum difference data among the difference data calculated by said difference data calculating means.

7. An apparatus according to claim 6, wherein said position data forming means includes level range instructing data forming means for receiving the maximum difference data released from said maximum difference data detecting means and the minimum difference data released from said minimum difference data detecting means, dividing said dynamic range into plural level ranges by digitizing the dynamic range of the difference levels of the pixel data determined by thus received maximum and minimum difference data, setting plural level range instructing data corresponding to the positions of the level ranges in said dynamic range, and forming and outputting said plural level range instructing data as said plural position data, representing the level ranges to which the difference levels of the pixel data in the pixel block divided by said dividing means belong.

8. An apparatus according to claim 7, wherein said difference data calculating means further includes:

a) difference data decoding means which, in the dynamic range of the difference data indicated by the maximum difference data from said maximum difference data detecting means and the minimum difference data from said minimum difference data detecting means, releases representative difference values of the level ranges respectively instructed by plural level range instructing data released from said level range instructing data forming means, as the decoded difference data; and b) anticipated pixel data forming means for forming anticipated pixel data, utilizing the decoded difference data released from said difference data decoding means.

9. An apparatus according to claim 7, wherein said discrimination means is so arranged as to calculate the difference between the maximum difference data from said maximum difference data detecting means and the minimum difference data from said minimum difference data detecting means, and to discriminate that the corresponding pixel block belongs to a moving image area in the frame if said difference is larger than a predetermined value, or that the corresponding pixel block belongs to a still image area in the frame if said difference is smaller than said predetermined value.

10. An image information transmitting apparatus for transmitting image information in which a frame is composed of plural pixel data, comprising:

a) dividing means for dividing plural image data corresponding to image information of said frame into plural pixel blocks each containing a predetermined number of pixel data;

b) discrimination means for discriminating whether each of the pixel blocks divided by said dividing means belongs to a moving image area or a still image area in said frame and releasing the result of discrimination;

c) converter means for inspecting the result of discrimination obtained from said discrimination means for a predetermined period on each of the pixel blocks divided by said dividing means, and converting the latest result of discrimination to the other if the result of discrimination for a pixel block continues to indicate the still image area in excess of said predetermined period;

d) first encoded data forming means for receiving the pixel data of a pixel block divided by said dividing means and forming first encoded data by encoding said pixel data solely utilizing the pixel data of said pixel block according to a first encoding method;

e) second encoding data forming means for receiving the pixel data of a pixel block divided by said dividing means and forming second encoded data by encoding said pixel data utilizing the pixel data of said pixel block and those of another block according to a second encoding method; and f) selective output means for selectively releasing the first encoded data from said first encoded data forming means or the second encoded data from said second encoded data forming means, according to the result of discrimination released from said converter means.

11. An apparatus according to claim 10, wherein said converter means includes:

a) plural counter means respectively corresponding to the pixel blocks divided by said dividing means, each adapted to count upwards in response to the entry of a result of discrimination, indicating the still image area, from said discrimination means, and further adapted to release a detection signal and reset the count when said result of discrimination is entered consecutively in excess of a predetermined number of times;

b) input switch means for supplying the results of discrimination obtained from said discrimination means corresponding to the pixel blocks divided by said dividing means, respectively to the corresponding ones of said plural counter means; and c) discrimination result varying means for varying the result of discrimination indicating a still image area for one of the pixel blocks divided by said dividing means to a result indicating a moving image area, in case a detection signal is released from corresponding one of said plural counter means.

12. An apparatus according to claim 11, wherein said second encoded data forming means includes:

a) difference data calculating means for calculating the difference data between the pixel data in a pixel block divided by said dividing means, and anticipated pixel data of a pixel block corresponding to the above-mentioned pixel block among the pixel blocks of an already transmitted frame;

b) distribution data forming means for receiving the difference data calculated by said difference data calculating means, and forming plural distribution data which represent the distribution of levels of the difference data and which are mutually distinguishable; and c) position data forming means for forming, by means of plural distribution data formed by said distribution data forming means, plural position data indicating the positions of the difference data calculated by said difference data calculating means in the distribution of levels of the difference data represented by said plural distribution data.

13. An apparatus according to claim 12, wherein said distribution data forming means includes:

a) maximum difference data detecting means for detecting and releasing the maximum difference data among the difference data calculated by said difference data calculating means; and b) minimum difference data detecting means for detecting and releasing the minimum difference data among the difference data calculated by said difference data calculating means.

14. An apparatus according to claim 13, wherein said position data forming means includes level range instructing data forming means for receiving the maximum difference data released from said maximum difference data detecting means and the minimum difference data released from said minimum difference data detecting means, digitizing the dynamic range of the difference levels of the pixel data determined by thus received maximum and minimum difference data, thereby dividing said dynamic range into plural level ranges, setting plural level range instructing data corresponding to the position of the level ranges in said dynamic range, and forming said plural position data, representing the level ranges to which the difference levels of the pixel data in the pixel block divided by said dividing means belong.

15. An apparatus according to claim 14, wherein said difference data calculating means further includes;

a) difference data decoding means which, in the dynamic range of the difference data indicated by the maximum difference data from said maximum difference data detecting means and the minimum difference data from said minimum difference data detecting means, releases representative difference values of the level ranges respectively instructed by plural level range instructing data released from said level range instructing data forming means, as the decoded difference data; and b) anticipated pixel data forming means for forming anticipated pixel data, utilizing the decoded difference data released from said difference data decoding means.

16. An apparatus according to claim 14, wherein said discrimination means is so arranged as to calculate the difference between the maximum difference data from said maximum difference data detecting means and the minimum difference data from said minimum difference data detecting means, and to discriminate that the corresponding pixel block belongs to a moving image area in the frame if said difference is larger than a predetermined value, or that the corresponding pixel block belongs to a still image area in the frame if said difference is smaller than said predetermined value.

17. An image information transmitting system for transmitting image information of which a frame is composed of plural pixel data, comprising:

A) a transmitting apparatus including:

a) dividing means for dividing plural pixel data corresponding to the image information of said frame into plural pixel blocks each containing a predetermined number of pixel data;

b) discrimination means for discriminating whether each of said pixel blocks, divided by said dividing means, belongs to a moving image area or a still image area in said frame, and releasing discrimination data;

c) first encoded data forming means for forming first encoded data by encoding the pixel data in a pixel block divided by said dividing means solely utilizing the pixel data in said pixel block according to a first encoding method;

d) second encoded data forming means for forming second encoded data by encoding the pixel data in a pixel block divided by said dividing means utilizing the pixel data in said pixel block and those in another block according to a second encoding method;

e) transmission data forming means for causing the pixel data of a pixel block, discriminated by said discrimination means as belonging to the moving image area, to be encoded by said first encoded data forming means, also causing the pixel data of a pixel block, discriminated as belonging to the still image area, to be encoded by said second encoded data forming means, forming transmission data from thus encoded data and the discrimination data released from said discrimination means and sending said transmission data to a transmission channel; and B) a receiving apparatus including:

a) separator means for separating the encoded data and the discrimination data from the transmission data sent by said transmitting apparatus;

b) first decoded data forming means for forming first decoded data by decoding the encoded data, separated by said separator means, with a first decoding method corresponding to said first encoding method;

c) second decoded data forming means for forming second decoded data by decoding the encoded data, separated by said separator means, with a second decoding method corresponding to said second encoding method;

d) pixel data regenerating means for causing the encoded data, separated by said separator means, to be decoded by said first decoded data forming means or said second decoded data forming means according to the discrimination data separated by said separator means, thereby regenerating the pixel data.

18. A receiving apparatus for reproducing image data from received transmission data transmitted from a transmission apparatus which divides image information consisting of a plurality of pixel data into plural pixel blocks each containing a predetermined number of pixel data, forms discrimination data by discriminating whether each of the pixel blocks belongs to a moving image area or a still image area in a frame composed of the plural pixel data, forms first encoded data according to a first encoding method by utilizing solely the pixel data of any of the pixel blocks discriminated as belonging to the moving image area, forms second encoded data according to a second encoding method by utilizing the pixel data of any of the pixel blocks discriminated as belonging to the still image area and the pixel data of any other of the pixel blocks, and then transmits the first encoded data, the second encoded data and the discrimination data as transmission data; said receiving apparatus comprising:

(A) separation means for separating the encoded data and the discrimination data from the transmission data transmitted by the transmission apparatus; and (B) pixel data regenerating means for selecting one of a first and second decoding methods respectively corresponding to the first and second encoding methods, according to the discrimination data separated by said separation means in order to decode the encoded data separated by said separation means and for regenerating the pixel data from the encoded data separated by said separating means according to the selected decoding method.

19. A receiving apparatus according to claim 18, wherein said pixel data regenerating means further comprises:

(a) first decoded data forming means for forming first decoded data by decoding the encoded data separated by said separation means according to the first decoding method, corresponding to the first encoding method;

(b) second decoded data forming means for forming second decoded data by decoding the encoded data separated by said separation means according to the second decoding method, corresponding to the second encoding method; and (c) decoded data selective-outputting means for selecting one of the first and the second decoded data formed respectively by said first and second decoded data forming means according to the discrimination data separated by said separation means and for outputting the selected decoded data.

20. An image information transmitting method for transmitting image information in which a frame is composed of plural pixel data, comprising the steps of:

(A) dividing plural data corresponding to image information of the frame into plural pixel blocks each containing a predetermined number of pixel data;

(B) forming discrimination data by discriminating whether each of the pixel blocks produced in said dividing step belongs to a moving image area or a still image area in the frame, forming first encoded data according to a first encoding method by utilizing solely the pixel data of any of the pixel blocks discriminated as belonging to the moving image area, forming second encoded data according to a second encoding method by utilizing the pixel data of the pixel block discriminated as belonging to the still image area and the pixel data of any other of the pixel blocks and transmitting the first encoded data, the second encoded data and the discrimination data as transmission data;

(C) separating the first or second encoded data and the discrimination data from the transmission data transmitted in said forming and transmitting step; and (D) selecting one of the first and second decoding methods respectively corresponding to the first and second encoding methods, according to the discrimination data separated in said separating step in order to decode the encoded data separated in said separating step, and regenerating pixel data from the encoded data separated in said separating step according to the selected decoding method.

* * * * *

UNITED STATES PATENT AND TRADEMARK OFFICE
CERTIFICATE OF CORRECTION

PATENT NO. : 5,040,060

DATED : August 13, 1991

INVENTOR(S) : MITSURU OWADA, ET AL.

It is certified that error appears in the above-identified patent and that said Letters Patent is hereby corrected as shown below:

On title page, item

[56] REFERENCES CITED

U.S. PATENT DOCUMENTS, "4,203,352  10/1987  Kondo"
should read  --4,703,352  10/1987  Kondo--.

IN [57] ABSTRACT

Line 1, "An" should read --In an--.
Line 20, "a" should be deleted.

COLUMN 1

Line 48, "released" should read --released in-- and
"of pixel" should read --of said pixel--.

COLUMN 3

Line 1, "the" (first occurrence) should be deleted.
Line 5, "riorated" should read --riorates--.

COLUMN 4

Line 53, "receiving" should read --receiving circuit--.

COLUMN 5

Line 19, "subtractor" should read --subtracter--.

UNITED STATES PATENT AND TRADEMARK OFFICE
CERTIFICATE OF CORRECTION

PATENT NO. : 5,040,060

DATED : August 13, 1991

INVENTOR(S) : MITSURU OWADA, ET AL.

It is certified that error appears in the above-identified patent and that said Letters Patent is hereby corrected as shown below:

COLUMN 5

Line 23, "subtractor 1;" should read --subtracter 1;--.
    Line 24, "detector 3" should read --detector--.

COLUMN 6

Line 12, "subtractor 1," should read --subtracter 1,--.
    Line 30, "In" should read --An--.
    Line 49, "minmax" should read --min-max--.

COLUMN 9

Line 22, "only for" should read --only, for--.

COLUMN 10

Line 9, "increased" should read --increase--.

COLUMN 12

Line 55, "encoding" should read --encoded--.

UNITED STATES PATENT AND TRADEMARK OFFICE
CERTIFICATE OF CORRECTION

PATENT NO. : 5,040,060

DATED : August 13, 1991

INVENTOR(S) : MITSURU OWADA, ET AL.

It is certified that error appears in the above-identified patent and that said Letters Patent is hereby corrected as shown below:

COLUMN 14

Line 2, "includes;" should read --includes:--.

Signed and Sealed this

Thirtieth Day of March, 1993

*Attest:*

STEPHEN G. KUNIN

*Attesting Officer*    Acting Commissioner of Patents and Trademarks